United States Patent Office 3,560,460
Patented Feb. 2, 1971

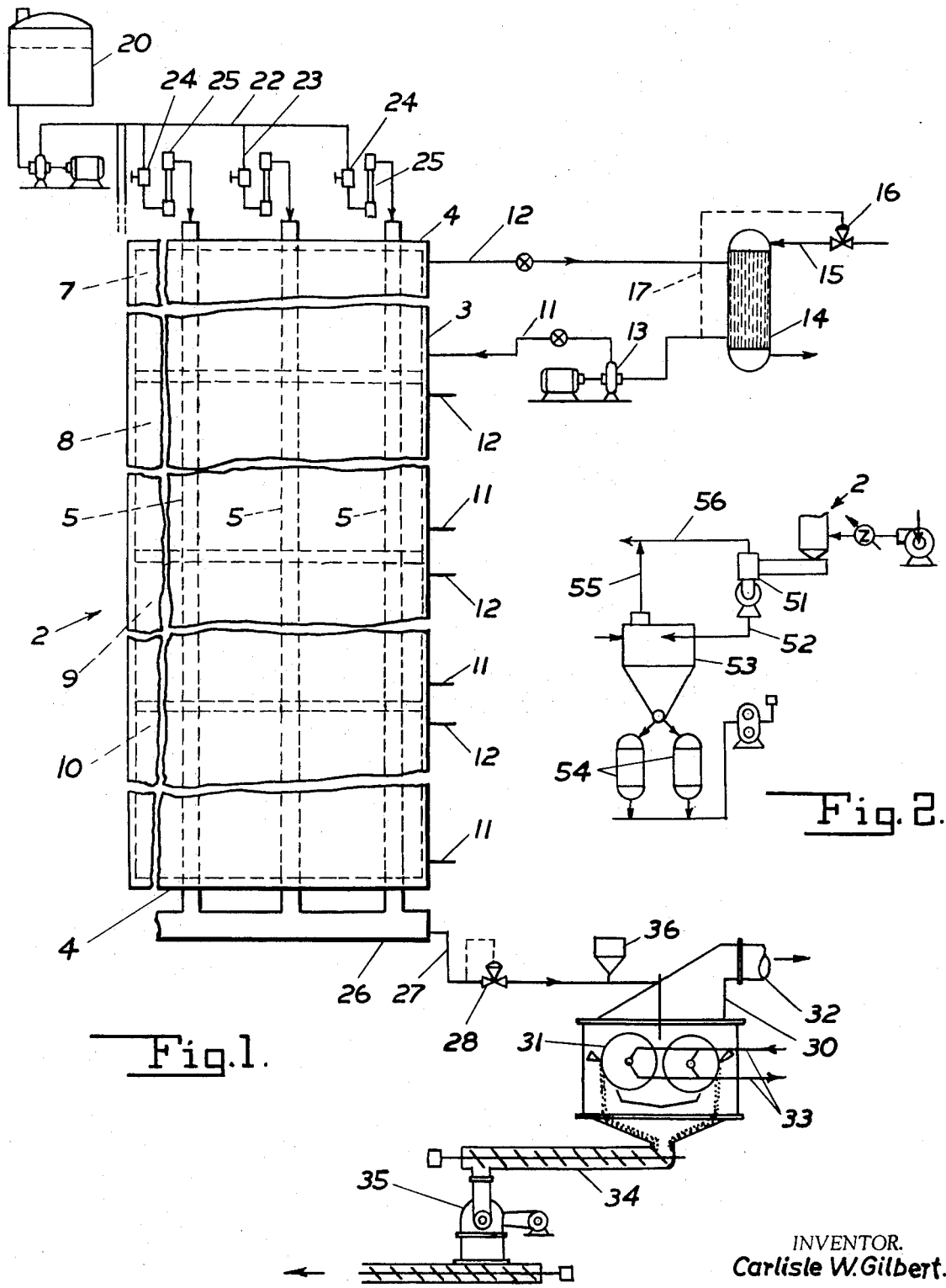

3,560,460
POLYMERIZATION OF VINYL CHLORIDE AND VINYL ACETATE TO MAKE A RESIN PRODUCT
Carlisle W. Gilbert, Mount Lebanon Township, Allegheny County, Pa., assignor to Blaw-Knox Company, Pittsburgh, Pa., a corporation of Delaware
Filed July 24, 1968, Ser. No. 747,227
Int. Cl. C08f 15/24, 3/50, 3/22
U.S. Cl. 260—87.1      16 Claims

ABSTRACT OF THE DISCLOSURE

This application discloses a method and apparatus for the continuous polymerization of vinyl chloride with other monomers in the manufacture of thermoplastic resins wherein the monomers are combined with a solvent and the mixture forced at a predetermined slow rate through a long tubular reactor at constantly controlled pressure and temperature conditions. The polymer, upon discharge from the reactor, is stripped of the solvent and any remaining monomer or other volatile, while the polymer is being formed into a homogenous solid, as by extrusion or drum drying. Generally it is then pulverized to the form in which it is commercially sold. Usually a catalyst is added to the monomer solvent mixture before the mixture enters the reactor.

---

This invention relates to the manufacture of thermoplastic resin and more particularly to a method of and apparatus for the conversion of a resin-forming monomer by polymerization into a commercial thermoplastic resin, and to a novel product derived thereby, and more especially this invention relates to the production of high molecular weight vinyl chloride copolymers.

Thermoplastic resins are manufactured by the processing of an organic compound capable, under proper conditions, of being converted into long chain molecules, or polymerized into a solid resinous material that is usually subsequently combined with such ingredients as fillers, pigments, plasticizers, and modifiers of various kinds, for the manufacture of plastic articles, sheets, tiles, films, and coatings.

Although processes presently designated as continuous processes for effecting the polymerization of monomers are presently in use, they are in fact semi-continuous, in that the apparatus comprises a series of vessels with an agitator for each vessel, and the material being reacted progresses in batch stages from one vessel to another. A process of this type involves a considerable initial investment for apparatus and structures to house and accommodate it. Maintenance of the equipment is costly and the utility requirements for its operation are expensive. More important, however, is the lack of any precise control of the process, with resulting variation in quality and uniformity of the product.

The present invention has for its object to provide a continuous apparatus and method for producing a high molecular weight vinyl copolymer of improved quality, subject to close control of the polymerization reaction, and to reduce the cost of production, as well as the cost of the initial plant investment.

Generally explained, this invention dispenses with the vessels and agitators therefor as heretofore used. Instead, the monomers to be copolymerized are combined with a solvent or suitable liquid vehicle and then the mixture, along with an appropriate catalyst, is introduced into the top of a vertical or generally vertical long slender tube down which it moves slowly under pressure with a uniform flow in a true sense, that is, steady in time, or the same at all points in space, or what is sometimes termed a "plug" flow in which the liquid moves without appreciable turbulence as a continuous liquid plug. While shorter tubes have been used in pilot plant operations where rate of production is not an important factor, a commercial operation contemplates a tube of forty feet or more, even up to eighty feet in length, and of a uniform inside diameter in the range of one to three inches. A relatively small diameter of the order here indicated is desirable to secure practically uniform temperature radially across the contents of the tube at any particular level. The length of the reactor is governed by the maximum flow rate which can be attained with plug flow characteristics. In a commercial plant the reactor length will also be governed by the economics of the mechanical design and construction. The retention time of the material in the tube is a matter of hours, commonly something in the order of 10 to 15 hours. For this reason commercial considerations, as well as technical ones, require a tube of considerable length, about forty feet being a desirable minimum. Since an 80 foot tube will accept a throughput of twice that of a 40 foot tube, lengths of the order of 40 to 80 feet are preferable. Heights above 80 feet could be used, but commercial considerations suggest 80 feet as a practical maximum. A second significant reason for a long slender tube is that control of temperature along the length of the tube is important. This is achieved by provision of a succession of jackets along the tube through which a heat exchange medium is provided. This permits controlled variation of the reaction temperature as the material is forced through the tube under plug flow conditions. By having a tube of adequate length, combined with plug flow of the material through each single jacketed zone, the intermingling of the material between zones is negligible. By virtue of this method and apparatus, optimum conditions for high molecular weight polymerization can be established and maintained with the production of a uniformly consistent product and uniform quality. At the same time, the process is continuous and may continue day after day without interruption. The apparatus is relatively simple and inexpensive. Multiple tubes are grouped together in parallel for larger production capacity. Provision is made for regulating the discharge from the tube in order to maintain uniform flow under pressure throughout the tube length. Pressure should be high enough in the tube to prevent vaporization of either the solvent or the monomer, since the development of gas bubbles or cavitation would disturb the uniform quiescent flow down the tube.

While I am aware that polymerization of certain monomers in tubular reactors has heretofore been proposed as disclosed in Kuhn patent 3,040,013, granted June 19, 1962, the process and apparatus there disclosed is applicable only for the production of low molecular weight polymers. Furthermore, the Kuhn patent does not apply to the polymerization of vinyl chloride copolymers. Many other types of reactors have also been proposed, but for various reasons have not proved to be commercially successful for high molecular weight polymerization. Commercial production of vinyl chloride with vinyl acetate and other monomers as now practiced continues to employ batch polymerization with semi-continuous operations to recover the product in its finished form.

The invention may be more fully understood by reference to the accompanying drawings, in which corresponding reference numerals indicate corresponding parts, and wherein:

FIG. 1 is a schematic view and flow diagram showing a preferred embodiment of my invention; and FIG. 2 is a partial schematic view and flow diagram of the apparatus showing a modified arrangement for the discharge portion only of FIG. 1, there being here shown an extrusion unit in place of the drum dryer of FIG. 1.

In the drawings, 2 designates generally the reactor which is in the form of enclosing shell 3 having top and bottom walls 4. Within this enclosure are one or more, preferably several long slender vertically-extending stainless steel tubes 5, which extend through the end walls 4 at the top and bottom, and are sealed to these walls where they pass through. Typically the pipes 5 are of the order of forty to eighty feet in length, and from one inch to three inches inside diameter. At a length of eighty feet, an internal diameter of one and one-half inches is preferable.

Inside the enclosure, at various levels, are transverse partitions 6 dividing the interior of the enclosure into separate compartments or zones 7, 8, 9 and 10, respectitively, from the top down, but the number of zones may be more or less than the four here shown. For most cases it appears that four zones are preferable. The tubes 5 are sealed in the partitions 6 so that each zone inside the enclosure is separate from the others for the circulation of fluid therethrough, although the pipes 5 are unobstructed from end to end. Usually the zones are of equal length from top to bottom, as indicated, by variations in the length of successive zones can be provided for.

There is an inlet pipe 11 for the introduction of a temperature regulating fluid to each zone and an outlet pipe 12 leading from each zone. Each zone has a fluid circulating system, only one of which is shown, but which is the same for the other zones. It includes a motor-driven pump 13, a heat exchanger 14 to which hot or cold heat exchange medium is supplied through pipe 15 with a temperature controlled flow valve 16, and control line 17 indicated in dotted lines. In some zones heat may be supplied, and in others cooling may be required, depending on the monomer and heat requirements as polymerization proceeds, so that temperature conditions in each zone throughout the length of the tube that is within the enclosure can be regulated to the requirements of a particular resin. Each zone is long enough so that the contents of the tube in transition from one zone to another is inconsequential compared to the total length of the zone. This assures that a high temperature in one zone, for instance, will have little effect in temperature throughout most of the length of an adjacent zone or zones.

The monomer to be polymerized is supplied to a feed tank 20 usually along with an initiator or catalyst such as hydrogen peroxide and organic peroxides. There is also mixed with the monomer a non-reactive solvent. Examples of monomers are vinyl chloride, vinyl acetate, and particularly vinyl chloride vinyl acetate combined. Examples of solvents in which the monomer and polymer are both soluble under the conditions of polymerization herein described are: acetone, methyl ethyl ketone, methyl isobutyl ketone, cyclohexanone and diethyl ether.

The mixture from the feed tank is forced under pressure from the feed tank by a motor-driven pump 21 into a header 22. A separate pipe 23 leads from this header into each one of the tubes 5, each pipe 23 including an adjustable valve 24, and preferably a flow meter 25, so that practically equal flow is maintained through all of the tubes.

All of the tubes 5 are connected at their lower ends into a manifold 26 from which leads a pipe 27 for conducting the outflowing products to means for removing solvent and unreacted monomer from the polymer. In the pipe 27 there is a pressure control valve 28 for regulating the outflow from the reactor to maintain a constant outlet pressure therein, dotted line 29 indicating means for transmitting pressure upstream of the valve to the valve actuator. The pump 21 and the control valve 28 cooperate to maintain a controlled pressure in the tubes 5 in excess of vaporization pressure of compounds in the tubes under conditions of polymerization. This is preferably in the range of 100 to 200 lbs. per square inch above the vapor pressure of the reacting mixture.

The pipe 27 terminates inside a flash chamber 30 in which, according to FIG. 1, there is a drum dryer unit 31 of any preferred construction, such dryers being well known, and its construction forms no part per se of this invention. The liquid from pipe 27 is discharged into the space between the tops of the rolls of the drum dryer and solvent and unreacted monomer released from pipe 27 are withdrawn through a duct 32 and condensed, the condenser not being shown. They may then be returned to the feed tank, usually after being separated by fractionation.

The drums of the drum dryer are heated with steam in the usual manner, as indicated by pipes 33, and operated at a temperature below that at which the polymer deteriorates, somewhere in the range of 212° F. to 350° F. In the operation of the drum dryer, more solvent and unreacted monomer are released to be withdrawn from the enclosure in the manner described as the polymer forms into a film on the drying drums. The dried film as it is scraped away from the drums in the usual manner, is carried away in a conveyor 34, this being an enclosed conveyor, as for example a vaportight screw. The conveyor delivers the resin to a grinder 35 where it is ground to the fine granular condition, and is then a commercial product.

As the monomer-solvent feed enters a tube, it may be relatively cold, and heat is supplied around the tube in the top zone 7 by circulation of hot water or other heat exchange fluid therethrough. Once polymerization begins, the reaction is exothermic, so that cooling at controlled rates may be provided in subsequent zones such as 8 and 9. As the polymerization nears completion, more heat may be necessary both because the reaction slows down as unreacted monomer diminishes and the polymer increases the viscosity of the mixture, and increased heat overcomes the increase in viscosity which might otherwise undesirably retard the liquid flow both at the lower tube end and through pipe 27.

By regulating temperature and feed rate in the tubes, the yield or polymerization and molecular weight may be accurately controlled, and consistently uniform product is obtained.

In the arrangement shown in FIG. 2, the pipe 27 and drum dryer are omitted and the polymer is discharged directly into an enclosed extruder 50 which maintains a back pressure in the reactor tube or tubes, eliminating the pressure control valve in the outlet, although even here its use may be desirable. The receiving chamber of the extruder is preferably heated. The polymer is discharged as a continuous tape or ribbon from which unreacted monomer and solvent are released as the hot extrusion emerges into an enclosure 51. The product is fed through conduit 52 directly to a grinder 53 discharging alternately into closed receiving vessels 54. The grinder may be provided with an injector for anti-static fluid supply purposes. There are some vapors released in the grinder and these are removed through pipe 55 to combine with vapors withdrawn from the extruder through pipe 56. The monomer and solvents which are withdrawn are condensed for reuse as above described. The reactor 2 and provision for feeding a monomer-solvent mix through the tubes is the same as the arrangement shown in FIG. 1 and has not therefore been duplicated.

The feed must contain a proper amount of solvent or diluent, sometimes referred to herein as a vehicle, in order to produce the desired result. Although it is desirable for economic reason to use the least amount of solvent possible, the amount must be adequate to provide the flow properties and heat transfer required.

The initiator catalyst is usually used in an amount for any particular monomer according to the monomer being processed following formulae well known in the art, the catalyst varying in type and amount with the monomer and the character of the polymer to be produced.

Since the instant process is continuous and all parameters affecting polymerization of a particular monomer can be closely controlled, uniform quality of finished product can be achieved, once the optimum conditions of flow, pressure and temperature have been established. In general it is more difficult to polymerize combined monomers for the production of high molecular weight copolymers, and the present invention is unique in the success achieved with continuous runs in the production of copolymers. The following examples are indicative of the process and provide a guide for its practice.

EXAMPLE I

Consider a single tube reactor of 1½ inch diameter and 40 feet in length, vinyl chloride-vinyl acetate copolymer is produced by combining the monomers in a weight ratio of 120 to 23. It is mixed with about 57 parts by weight of acetone as a solvent and 0.075% by weight, based on monomers charged, of dichlorobenzoyl peroxide as a catalyst. A pressure of 400 p.s.i.g. is maintained in the top end of the tube with a feed rate providing retention time of 10½ hours in the tube, and due to hydrostatic pressure, increases downwardly. There was a yield of dry product production at 1.4 pounds per hour. The temperature in the zones 7, 8, 9 and 10 are maintained at 115° F. The product from the tube is drum-dried on rolls heated to about 285° F. The flaked resin product is ground to a fineness less than 40 mesh. It is characterized by being uniform throughout the run and the resin drains clear of the tubes upon termination of the run. It is characterized by a bound acetate content of 10.0% a relative viscosity of 1.875, free of solvent or unreacted monomer, and is of good commercial quality. Standard measurements used in the industry known as plasticizer absorption value and plasticizer adsorption factor showed values 2 to 3 times values obtained from high quality vinyl chloride-vinyl acetate copolymer of the same kind purchased on the market made by the conventional process.

EXAMPLE II

Considering again only one tube in the reactor of 1½ inch diameter and 40 feet in length, vinyl acetate-vinyl chloride copolymer is produced by combining the monomers in the weight ratio 20 to 20. The combined monomers are mixed with about 50% of acetone as a solvent and 0.2% by weight, based on monomer charged, of dichlorobenzoyl peroxide as a catalyst. A pressure of 400 p.s.i.g. is maintained in the top end of the tube with a feed rate providing a retention time of 13 hours in the tube. There was a yield of dry product production rate of 1.2 pounds per hour. The temperature in zones 7, 8, 9 and 10 are maintained at 125° F., 125° F., 150° F., and 165° F., respectively. The product from the tube is drum-dried on rolls heated to about 285° F. The flaked resin product is ground to a fineness less than 40 mesh. It is characterized by being uniform throughout the run and the resin drains clear of the tubes upon termination of the run. It is characterized by a bound acetate content of 15.3%, and a relative viscosity of 1.43, free of solvent or unreacted monomer, and is of good commercial quality. Standard measurements used in the industry know as plasticizer absorption value and plasticizer adsorption factor showed values 2 to 3 times values obtained from high quality resin of the same kind purchased on the market made by the conventional process.

For practical purposes, each tube should be of the order of forty or more feet in length, eighty feet being probably the generally preferred length for most resins and for practical considerations. The tube should be vertical or steeply inclined to insure plug flow and free drainage of the reactants and product through the tube. The specific gravity of the polymer-solvent mixture is greater than the monomer-solvent mixture and as a result in a vertical tubular reactor for material drains freely from the walls of the tube. Each zone is several feet in length with a retention time of usually an hour or more in each zone. The flow rate is slow, and even if the retention time were but an hour, thirty or forty feet an hour in any process would be considered slow. The present invention, however, contemplates a retention time of several hours, usually between ten and fifteen hours, for which reason a tube in excess of forty feet is, for practical purposes, preferred. With a tube eighty feet in length and a retention time of ten hours, the rate of flow, after start-up, is eight feet per hour.

The diluent or solvent keeps the polymer as it is formed dispersed, so that even though there is an increase in viscosity toward the bottom of the tube as the resin polymerizes, the polymer is dispersed through or dissolved in the vehicle so that there is no plugging of the tubes or outlet valve, and the apparatus can normally function day after day without interruption. The volume of solvent or diluent in proportion to monomer in effecting copolymerization may vary, but it will normally be at least 20% by weight of the feed mix into the tube, and preferably from 50% to 60% of the weight of the combined monomers, as indicated in the foregoing examples. As previously stated, there is no advantage in using more than is necessary to retard precipitation of the resin in the tube, since it is otherwise inert except as it may also facilitate heat transfer through the mix, especially as polymerization proceeds, and the more solvent that is used, the more volume there is to pass through the tube, thus reducing yield per tube. Any excess of solvent over that necessary to meet the above requirements would be just so much more liquid to separate from unreacted monomer.

It will, of course, be understood that where the polymer is discharged directly into an extruder, the speed at which the extruder is operated will control pressure in the reactor, and it may be operated in relation to the variable input constant pressure pump arrangement to produce controlled pressure conditions in the reactor.

The monomers to which the invention is principally applicable comprise the general group of vinyl chloride-vinyl acetate copolymers and compounds which are formed by addition polymerization as distinguished from condensation polymers, and as indicated above, the apparatus and process have proved to be exceptional in the manufacture of high molecular weight vinyl chloride-vinyl acetate copolymers where a much improved quality product has resulted from this process.

While I have shown and described a preferred embodiment of my invention, structural modifications and changes in the apparatus to practice the process are within the contemplation of my invention and under the scope of the following claims.

I claim:

1. In a process for copolymerizing vinyl chloride and vinyl acetate in the presence of a polymerization initiator, the improvement comprising: continuously introducing a mixture containing vinyl chloride, vinyl acetate, the polymerization initiator and an inert organic liquid diluent into a thin elongated reaction tube; passing the mixture in a thin stream through the reaction tube in plug flow; maintaining a temperature pressure and residence time to produce a high molecular weight vinyl chloride-vinyl acetate copolymer without vaporization of the mixture while maintaining said plug flow; and recovering a high molecular weight vinyl chloride-vinyl acetate copolymer from the tube.

2. The process as defined in claim 1 wherein the temperature throughout the reaction tube falls within the range from about 115° F. to about 165° F.

3. The process as defined in claim 2 wherein the diluent is a solvent for both the vinyl chloride and vinyl acetate monomers and the resulting copolymer.

4. The process as defined in claim 2 wherein the temperature is separately controlled in a plurality of zones along the length of the tube to both provide heat and to withdraw heat from the reaction mixture.

5. The process as defined in claim 2 wherein the diluent is employed in an amount which is at least about 20% by weight, of the mixture.

6. The process as defined in claim 2 wherein the tube is vertical and has a diameter within the range from about 1 inch to about 3 inches, and a length from about 40 feet to about 80 feet and the mixture is passed downwardly through the tube at a rate to provide a residence time from about 10 hours to about 15 hours.

7. The process as defined in claim 2 wherein the diluent is selected from the group consisting of acetone, methyl ethyl ketone, methyl isobutyl ketone, cyclohexanone and diethyl ether.

8. In a process for copolymerizing vinyl chloride and vinyl acetate in the presence of a polymerization initiator, the improvement comprising: continuously introducing a mixture containing vinyl chloride, vinyl acetate, a polymerization initiator and an inert organic liquid diluent which is a solvent for both the vinyl chloride and vinyl acetate monomers and the resulting copolymer into a reaction tube having a uniform inside diameter within the range from about 1 inch to about 3 inches; passing the mixture through the reaction tube in plug flow; maintaining a temperature, pressure and residence time to produce a high molecular weight vinyl chloride-vinyl acetate copolymer without vaporization of the mixture while maintaining said plug flow, said temperature falling within the range from about 115° F. to about 165° F. and said residence time falling within the range from about 10 hours to about 15 hours; and recovering the high molecular weight copolymer from the tube.

9. The process as defined in claim 8 wherein the diluent is selected from the group consisting of acetone, methyl ethyl ketone, methyl isobutyl ketone, cyclohexanone and diethyl ether.

10. The process as defined in claim 8 wherein the initiator is a peroxide.

11. The process as defined in claim 8 wherein the mixture is passed downwardly through a vertical tube.

12. The process as defined in claim 8 wherein the pressure in the tube is maintained at a value of at least about 400 p.s.i.

13. The process as defined in claim 8 wherein the diluent is present in an amount which is at least about 20%, by weight, of the mixture.

14. The process as defined in claim 8 wherein the diluent is present in an amount from about 50% to about 60% by weight, of the combined monomers.

15. The process as defined in claim 8 wherein the vinyl chloride-vinyl acetate monomers are combined in a weight ratio of about 120 to 23.

16. The process as defined in claim 8 wherein the vinyl chloride-vinyl acetate are combined in a weight ratio of about 80 to 20.

References Cited

UNITED STATES PATENTS

| | | | |
|---|---|---|---|
| 2,064,565 | 12/1936 | Reid | 260—87.1 |
| 2,716,641 | 8/1955 | van der Plas | 260—91.7 |
| 2,856,395 | 10/1958 | Richard, Jr., | 260—94.9 |
| 3,040,013 | 6/1962 | Kuhn | 260—93.5 |
| 3,414,499 | 12/1968 | Gardner | 204—159.22 |

OTHER REFERENCES

Thomas, C. M. et al., British Plastics (December 1958), pp. 522–524.

JOSEPH L. SCHOFER, Primary Examiner

C. A. HENDERSON, JR., Assistant Examiner

U.S. Cl. X.R.

23—252, 283, 288, 289; 260—32.8, 33.2, 89.1, 92.8, 95